Aug. 22, 1944.   E. A. BANSCHBACH   2,356,559
VEHICLE ARRESTOR
Filed Sept. 10, 1941
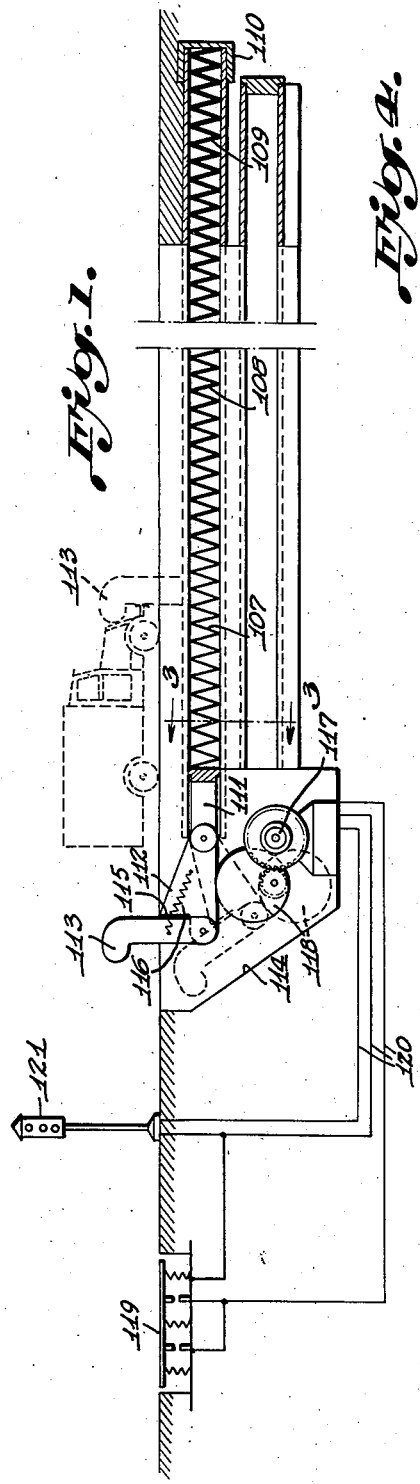
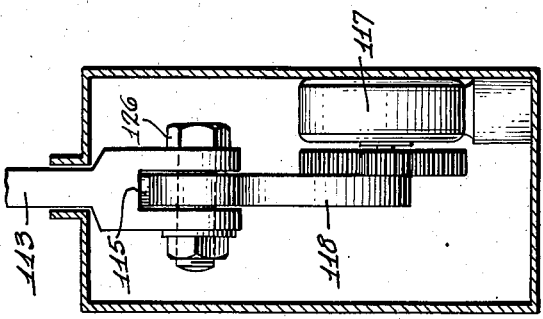
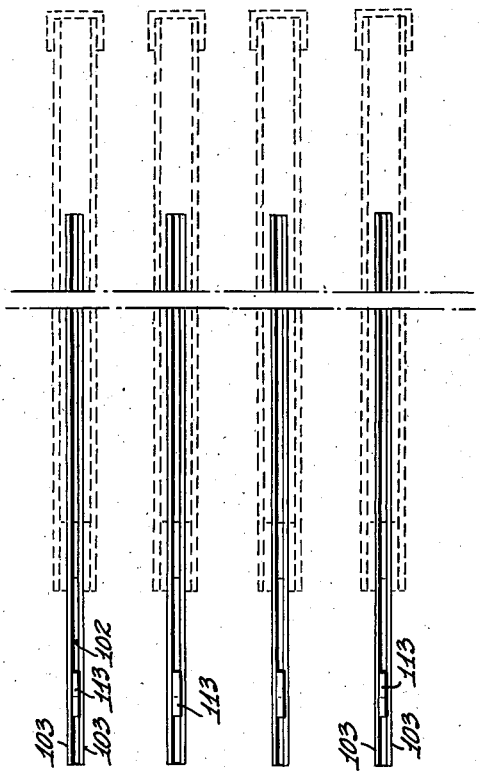
Inventor:
Edward A. Banschbach Patented Aug. 22, 1944

2,356,559

UNITED STATES PATENT OFFICE 2,356,559

VEHICLE ARRESTOR

Edward A. Banschbach, Madison, Wis.

Application September 10, 1941, Serial No. 410,302

2 Claims. (Cl. 39—6)

This invention relates in general to an obstruction in or upon a roadway, to arrest and stop vehicles thereon, and has more particular reference to a yielding or resilient obstruction for engaging and gradually stopping a vehicle and thereby protecting it and its occupants from danger or injury, and also preventing the vehicle from passing the obstruction and thereby protecting pedestrians and others outside of the vehicle.

An important object of the invention is in the provision of a safety appliance for use in highways for arresting and stopping vehicles and for providing a visible barrier which affords protection to pedestrians or persons waiting at the side of or in a roadway.

A further important object of the invention is in the provision of a vehicle arrestor which will stop a vehicle, such as an automobile, without undue violence to the car or its occupants.

Other and further objects will appear hereinafter, the preferred constructions being illustrated in the accompanying drawing, in which;

Fig. 1 is a somewhat diagrammatical view with parts shown in section, illustrating a vehicle arrestor of the type usually mounted below the level of a highway but movable above the highway to constitute a barrier together with a control signalling means therefor.

Fig. 2 is a plan view showing the roadway slots of a structure as shown in Fig. 1;

Fig. 3 is a sectional detail of the housing tubes or conduits as taken on the line 3—3 of Fig. 1;

Fig. 4 is a sectional view of the compartment housing the elevating mechanism.

Waiting pedestrians and vehicles may be protected upon or along a highway by a rigid barrier of stone, concrete, and the like, but by providing a yielding barrier of the roadway, even a heavily loaded, speeding vehicle, bus or truck, will be arrested and stopped without wrecking the vehicles and without danger to them or their loads to passengers within them, or to persons standing adjacent to the arrestors.

Referring more particularly to the drawing, an arrestor of the type shown by Figs. 1, 2, 3, and 4, comprises slots 102 provided in a roadway by inserting pairs of grooved members 103 which together form a substantially circular longitudinal passage 104 communicating with the roadway through the slot 102, and a lower passage 105 through which dirt, ice, snow, and debris will fall to the underneath drainage conduit 106.

The actuating means and vehicle arrestor, proper, 112, 113, and 116, together with the motive power, are set within the enlargement of the spring conduit, or compartment, as indicated by 114 of Fig. 1.

As shown in Fig. 1 the upper extension of the spring conduit 103 forms a most substantial slot 102 lining, and projects forward of the front end, of this spring conduit 103, and above the vehicle arrestor, and motive power, compartment 114 of Fig. 1, and as also shown, thus extended, in Fig. 2.

This forward extension of the slot lining walls of 103 forms an unpassable resistance, added to the top wall of the compartment 114, itself, and positively prevents 113 from being thrust upwardly, through the narrow slot 102 of Figs. 2, 3, and 4.

The circles on 113 of Fig. 1 indicate necessary strength and width, to prevent upward passage thru the slot 102, and also to prevent failure of the resistance of 113 of Figs. 1 and 4.

In Fig. 4 this front view of the end of the spring conduit 103 shows the vehicle arrestor, proper, 112 and 113, in the raised and vehicle obstructing and arresting position.

In addition 126 of Fig. 4 shows the added obstruction of the over projecting ends of the pivot-bolt 126 to obstruct passage of 112 and 113 upwards into the slot 102.

Means for adding immovable anchorage of compartment 114 in the roadway and generally in concrete, is provided.

In the upper passage 104 is installed a series of compression springs preferably comprising sections 107, 108 and 109 of graduated resisting capacities.

The further or rear end of this passage 104, of 103, is closed by a cap, or other method, 110 which forms an abutment for the springs, and at the other end of the passage is a plunger 111 having a pivotal connection with one end of an abutment arm 112, the other end of which pivotally is connected to the bumper post 113. The post and arm are of a width to move upwardly through the slot 102 and the post is sufficiently long to extend through the slot and above the roadway to obstruct the passage of vehicles.

The arm does not move downwardly through the slot 102, until allowed to restore to normal position by the backing of the vehicle. It drops into the inoperative position, within compartment 114 of Fig. 1 beneath the roadway surface.

The arm 112 has an abutment surface 115 of 112 for adding strong bracing and resistance of 113 when raised and engaging impacting vehicles.

The spring 116 holds 113 against 112 and its abutment 115 and also allows vehicles to deflect 113 when impacting 113 from the side of 115 of Fig. 1, and momentarily driving 113 down, while the vehicle passes over it, deflected, in the reverse direction.

To raise the bumper above the level of the roadway a motor 117 is connected by a gearing with a cam 118 adapted to rotate on the underside of the arm 112 thus raising the arm 113 to the vehicle obstructing and arresting position, shown in Fig. 1, above the roadway and into the path of oncoming vehicles.

This motor may be controlled by a road plate 119 at a distance in an intersecting highway by means of conductors 120 leading to the motor and to a semaphore 121 for indicating the position of bumper arms 113.

When one or more of the bumper arms 113 are engaged by a vehicle, compression springs 107, 108 and 109 in accordance with the impact therewith, the bumper arms will be moved to a position as represented by the broken outline of a vehicle in Fig. 1, thus gradually and smoothly and resistingly arresting and finally stopping the vehicle, resiliently, and perhaps with no marring at all.

In a reverse moving, or opposite moving direction, to that shown, by the dotted line figure of a vehicle, the arm 113 would be momentarily and instantly deflected, downwards, enough to allow it to be under the lowest, underside of the vehicle, bumper or axle.

Upon passage of the vehicle over it 113 would instantly restore to upright and normal, vehicle obstructing position.

The resilient means 116 of Fig. 1 would allow the deflection and also restore it to the braced position against 115 of 112.

In a construction of this kind having an open slot, in a road way, it is necessary to provide for passage of dirt, debris, snow, crushed ice, etc., which may drop down thru the slot 102. This is provided for by the sub-spring conduit 104, Fig. 3, drainage conduit 106, with nearly full length slot connecting 106 with 104. This slot to be of wider opening than 102 in the roadway surface. Hence with the wide spacing between the coils of the compression springs, and the wider, lower or underside slot of 104, joining nearly full length 106 together, the objects which can pass thru the narrower surface slot 102, will pass right down, between the open compression spring spacings, and through the wider slot joining 104 and 106 where rain, snow, sprinkling, and flooding, will wash the accumulation within 106 into the sewers.

As the impact of vehicles against the barrier will always be in proportion to the weight of the vehicle, the resistance to the vehicle will result in reaction return of the barrier to normal only in proportion to the size of the vehicle. Hence there is practically no return thrust of the barrier to push the vehicles backwardly somewhat. Vehicles need back up and allow the barrier to follow them back until the barrier reaches normal, unoperated, position across the roadway.

Various other changes in the construction, combination and arrangements of the parts may be made without departing from the spirit and scope of the invention.

What I claim is:

1. In a roadway crossing barrier, an underpavement conduit with surface slot extending the principal length of the conduit, the conduit being filled with resilient means, a vehicle impact member movably mounted in the conduit and projecting upwardly through the slot whereby on impact by a vehicle, motion of the latter is resiliently arrested.

2. In a roadway crossing barrier, an underpavement conduit with surface slot extending the principal length of the conduit, the conduit being filled with lengths of springs of increasing strengths of resistance, for allowing graduated resistances, for widely varied speeds and weights of vehicles striking the impact member mounted in the conduit and projecting upwardly through the slot, whereby on impact of a vehicle, motion of the latter is resiliently and gradually resisted at first by the lighter resistance of the lighter springs and lastly by the much stronger resistance of the heavier springs.

EDWARD A. BANSCHBACH.